April 16, 1963 P. C. KESLING 3,085,336
ORTHODONTIC APPLIANCE
Filed Nov. 16, 1961 2 Sheets-Sheet 2
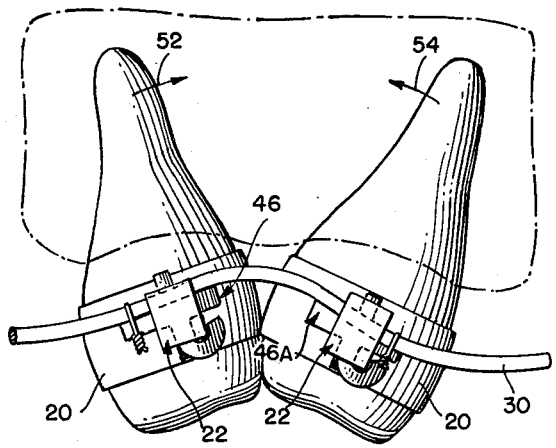
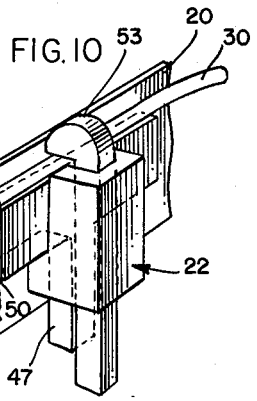
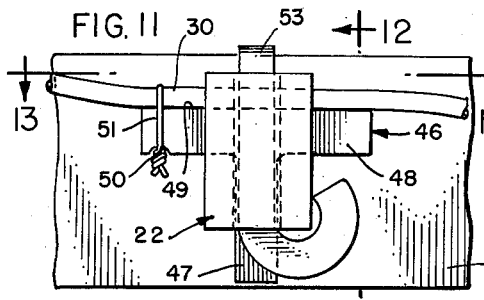
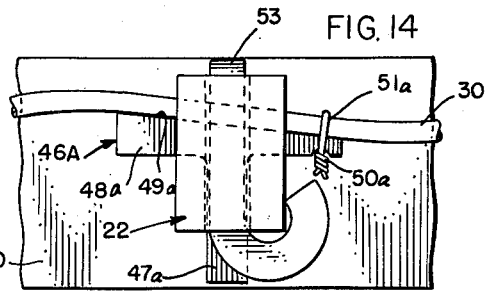
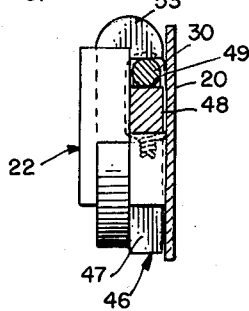
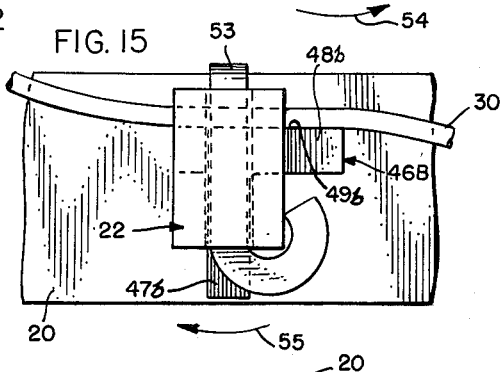
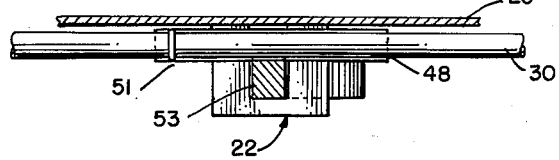
INVENTOR:
PETER C. KESLING
BY Marshall, Johnston, Cook & Root
ATT'YS United States Patent Office 3,085,336
Patented Apr. 16, 1963

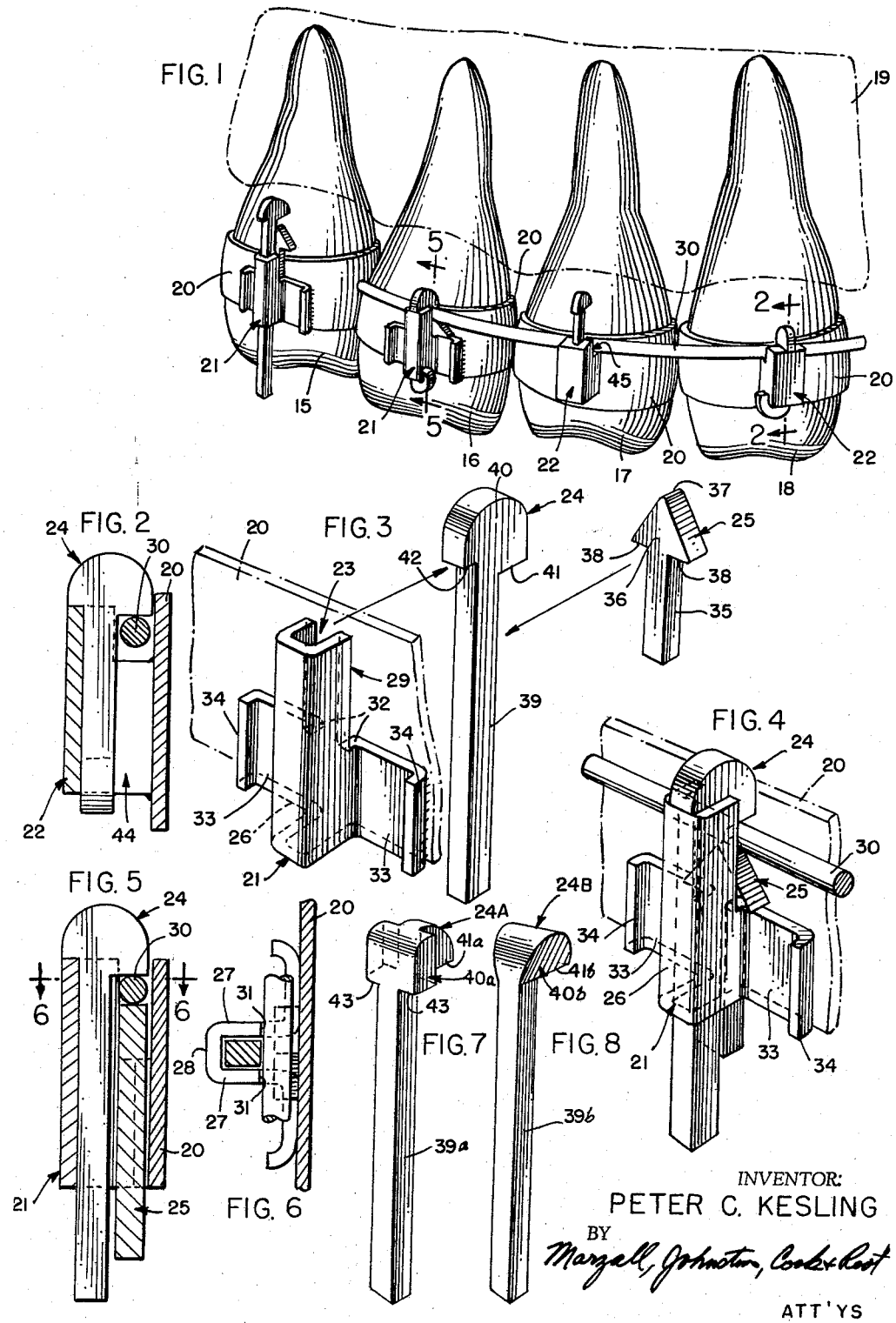

3,085,336
ORTHODONTIC APPLIANCE
Peter C. Kesling, Green Acres, La Porte, Ind.
Filed Nov. 16, 1961, Ser. No. 152,750
19 Claims. (Cl. 32—14)

This invention relates in general to an orthodontic appliance, and more particularly to an orthodontic lock pin for use with an orthodontic bracket to secure an arch wire to a tooth band in the processes of straightening teeth, and especially in controlling the straightening movement of all teeth except terminal teeth.

Further, the present invention deals with a combination orthodontic lock pin and pivot pin for use with the bracket disclosed in my copending application, Serial No. 100,157, filed April 3, 1961, and entitled "Orthodontic Lock Pin and Bracket Appliance." Moreover, the lock pin and lock pin and pivot pin arrangement of the present invention constitutes an improvement over the lock pin shown in my above mentioned copending application.

The lock pin and combination lock pin and pivot pin arrangement of the present invention is especially useful in connection with brackets to be mounted on teeth wherein it is desired to have freedom of tipping of a tooth in the mesial-distal direction. The novel lock pin of the present invention is shouldered and adapted for usage on standard orthodontic brackets that have been known for some time, and in such cases no pivot pin need be provided to define a relationship between the bracket and wire that allows freedom of tiping in the mesial-distal direction. Further, the present lock pin and pivot pin combination is advantageous over the shouldered lock pin disclosed in my above mentioned application inasmuch as the arch wire may be positioned on the bracket prior to the positioning of the lock pin thereon, this not being possible with the shouldered lock pin in said application.

Accordingly, it is an object of this invention to provide an improved orthodontic lock pin for use on orthodontic brackets heretofore known where tipping relationship between the arch wire and bracket is desired.

A further object of this invention is to provide a shouldered lock pin capable of being used on a conventional brackets and for establishing a connection between the arch wire and bracket to permit the tooth to tip freely in the mesial-distal direction.

Another object of this invention is in the provision of an orthodontic lock pin and pivot pin combination capable of facilitating the mounting of an arch wire on a bracket and thereby making it easier to establish the arch wire bracket arrangement.

A still further object of this invention is to provide an orthodontic lock pin and an orthodontic lock pin and pivot pin combination that may be easily and inexpensively manufactured, and easily and efficiently handled by the orthodontic practitioner.

A further object of this invention resides in the provision of an orthodontic lock pin and pivot pin combination that is capable of coacting with a bracket to maintain the arch wire in spaced relation from the bracket thereby permitting the tooth to tip freely in the mesial-distal direction.

A still further object of this invention is to provide an orthodontic appliance for attaching an arch wire to a tooth and to permit the tooth to tip freely in the mesial-distal direction, wherein a bracket is employed that may be used to provide controlled mesial-distal movement with one type of lock pin and where pivotal movement between the bracket and wire may be had by using a pivot pin for spacing the wire from any mesial-distal bracket obstruction together with a lock pin to hold the wire in position.

Another feature of the invention is to convert the pivot pin and conventional bracket combination above mentioned to provide controlled mesial-distal movement. This is accomplished by providing a T-shaped pin having a horizontal or inclined end against which the wire may be secured by the pin and/or by a ligature at one or both lateral ends thereof. Thus controlled movement and torquing of the tooth in either direction may be accomplished.

Hence, it is another object of this invention to provide a T-shaped or L-shaped control pin for use with the conventional bracket and a conventional pin or the pin of the present invention to enable controlled movement of the teeth to be accomplished and especially to effect torquing.

Other objects, features and advantages of the invention will be apparent from the following detailed disclosure, taken in conjunction with the accompanying sheets of drawings, wherein like reference numerals refer to like parts, in which:

FIG. 1 is a perspective view of a plurality of teeth having bands and brackets thereon and showing the relationship with the lock pins in place and partially removed;

FIG. 2 is an enlarged transverse sectional view taken through one of the bracket and lock pin combinations shown in FIG. 1 and substantially along line 2—2 therein;

FIG. 3 is a perspective exploded view of one of the lock pin and bracket combinations shown in FIG. 1;

FIG. 4 is a perspective view of the lock pin bracket and pivot pin combination with a wire mounted in place like that of FIG. 3;

FIG. 5 is an enlarged sectional view taken substantially along line 5—5 of FIG. 1;

FIG. 6 is a sectional view taken substantially along line 6—6 of FIG. 5;

FIG. 7 is a perspective view of a modified lock pin;

FIG. 8 is a perspective view of a still further modified lock pin;

FIG. 9 is a perspective view of a plurality of teeth having bands and brackets thereon and illustrating the usage of the T-shaped and L-shaped control pins of the invention;

FIG. 10 is a perspective view of one control pin embodiment for use with a conventional bracket and lock pin;

FIG. 11 is a front elevational view of the embodiment of FIG. 10;

FIG. 12 is a sectional view taken substantially along line 12—12 of FIG. 11;

FIG. 13 is a sectional view taken substantially along line 13—13 of FIG. 11;

FIG. 14 is a front elevational view of a modified control pin in combination with a conventional bracket and lock pin; and FIG. 15 is an elevational view of another modified control pin for use with the conventional bracket and lock pin.

Referring now to the drawings and particularly to FIG. 1, a plurality of teeth 15, 16, 17 and 18 are illustrated extending from the gingiva 19. Each of the teeth has mounted thereon a conventional tooth band 20 upon which may be secured an orthodontic bracket. The bracket mounted on the tooth bands of teeth 15 and 16 may be generally designated by the numeral 21 and may be identified as the all-stage bracket disclosed in the above mentioned application. And the bracket mounted on the tooth bands on teeth 17 and 18 may be generally designated by the numeral 22 and referred to as the conventional bracket to which the present invention may also be applied.

The all-stage bracket 21, as seen most clearly in FIGS. 3 and 4, is provided with an occlusal-gingivally extending opening 23 adapted to receive therein a lock pin 24 and a pivot pin 25 from the gingival end. However, it should be appreciated that the bracket could be placed on the band so that the end receiving the pins would be the occlusal end by rotating the bracket 180°. Preferably, the brackets will be arranged so that the pins will be inserted from the gingival end as shown in the drawings, and the bracket will be described herein as so positioned. The opening 23 is defined by a U-shaped in cross-section body 26 including substantially parallel opposed legs or walls 27, 27 and a bight portion or connecting wall 28. At the gingival-lingual corner of the bracket, a mesial-distally extending notch 29 is provided to define an opening with the tooth band for receiving the arch wire 30. The notch is defined by occlusal-gingivally extending, lingually facing edges 31, 31 that extend substantially parallel to the tooth band 20, and a bottom defined by gingivally facing edges 32. Attaching flanges 33, 33 extend in the mesial and distal directions from the walls 27, 27 and at the lingual edge thereof so that these flanges are adapted to contact the outer surface of the bands 20. The flanges may be suitably secured to the bands as by spot welding and/or soldering techniques. As may be seen particularly in FIG. 3, the gingivally facing edges of the flanges 33 are coplanar with the gingivally facing edges 32 of the notch.

When it is desired to use the bracket for controlling tooth movement in the mesial-distal direction, the arch wire will be secured against the gingival edges of the flanges, and in this connection, wings or arch wire supporting bars 34, 34 are also provided at the ends of the flanges 33 and extend buccal-lingually. The wings 34 have their gingivally facing edges in coplanar relationship with the gingival facing edges of the flanges and the notch bottom. And as disclosed in the above mentioned application, a shoulderless lock pin would be employed to draw the arch wire against the notch bottom, flange edges and wing edges when controlled movement in the mesial-distal direction is desired.

The appliances of the present invention are suitable for use on all except terminal teeth, and to simplify the terminology hereinafter employed, "buccal" will be used where "buccal" or "labial" may be used, but it is understood that "buccal" applies to "buccal" or "labial."

The problem encountered resides in being able to employ the all-stage bracket 21 for controlled or uncontrolled mesial-distal tooth movement depending upon what is needed and eliminating the necessity of changing brackets during the various stages of treatment. Generally during one stage of treatment, it is desired to have freedom of mesial-distal tooth movement during control of buccal-lingual movement One type of lock pin capable of being used with the all-stage bracket for accomplishing freedom of mesial-distal movement is disclosed in the above mentioned application. But this type of lock pin requires insertion of the arch wire in the slot of the lock pin before assembly of the lock pin on the bracket, and consequently simultaneous assemblage of the lock pin and wire onto the bracket. There are some instances where such simultaneous assemblage is not possible and the lock pin and pivot arrangement of the present invention overcomes this problem. For the pivot pin 25 of the present invention may be first inserted in the all-stage bracket 21, the arch wire then placed in the slot or notch against the pivot pin and subsequently locked in place by the lock pin 24.

The pivot pin 25 includes a stem 35 and a generally triangularly shaped head 36. The head 36 is pointed at the gingival end at 37 to define a pivot bearing upon which the arch wire may be supported. And this pointed end 37 is spaced gingivally of mesial and distal shoulders 38, 38 defined by the head and which are supported on the notch bottom defined by the edges 32. Accordingly, the arch wire as seen in FIG. 4 is spaced upwardly from the notch bottom and the gingivally facing edges of the flanges 33 and the wings 34. It will be appreciated that the pivotal point 37 may be made as sharp or as dull as desired and that the spacing of this point from the shoulders 38 may be varied depending upon the desires of the user. Further, the buccal-lingual width of the pivot pin 25 is slightly less than the buccal-lingual depth of the notch 29 so as to permit easy insertion of the pin along the notch and so that the stem is received within the opening in the bracket. This also permits insertion of the lock pin 24 in the opening. And it may now be seen that to attach the arch wire 30 to the all-stage bracket 21 to provide the free mesial-distal movement relationship, the pivot pin 25 may first be inserted, followed by positioning of the arch wire in the notch and against the pivot pin. Then the lock pin 24 may be inserted in the opening of the bracket and secured thereto to lock the wire in position.

The lock pin 24 includes an elongated body 39 dimensioned to be received in the opening 23 of the bracket and having a buccal-lingual thickness of substantially less than the buccal-lingual depth of the opening. Actually the buccal-lingual thickness of the body 39 together with the buccal-lingual thickness of the pivot pin stem 35 must be less than the buccal-lingual depth of the opening 23 so that the pivot pin and lock pin may be freely inserted into position in the bracket. Further, the body must be sized to permit positioning of the arch wire 30 between it and the band when the lock pin is in locking position. At the gingival end of the body 39, an enlarged head 40 is provided which is capable of spanning the buccal-lingual depth of the notch to lock the arch wire in position and to limit the movement of the lock pin into the opening so as to prevent binding with respect to the arch wire and the bracket.

The lock pin 24 includes a shoulder 41 on the lingual side of the body for spanning substantially the entire buccal-lingual depth of the notch and a shoulder 42 on the buccal side of the body for engagement with the gingival end of the bracket and to act as a stop in positioning the pin relative to the bracket. It may be noted in FIG. 3 that the shoulder 41 is spaced occlusally from the shoulder 42, but it should be appreciated that these shoulders may be coplanar if so desired or the shoulder 41 may even be gingivally spaced from the shoulder 42. After the lock pin 24 has been inserted, the occlusal end may then be bent over to firmly lock the arch wire and pivot pin in position. The end may be bent over as shown in FIG. 1 around the occlusal end of the bracket.

The head of the lock pin used to lock the arch wire to the bracket may take any number of forms as long as it is capable of spanning the buccal-lingual depth of the notch so as to block the path of the arch wire and to limit the occlusal positioning and movement so that the engaging shoulder does not bind against the arch wire. Other suitable forms of lock pin are shown in FIGS. 7 and 8 and identified by the numerals 24A and 24B.

The lock pin 24A of FIG. 7 also includes an elongated body 39a of the same general dimension and shape as the rectangular body 39 of the pin 24, and a head 40a. The head 40a differs in that the buccal side is coplanar with the buccal side of the elongated body 39a, and in that the head is widened mesial-distally to define bracket engagnig shoulders 43, 43 that are supported by the gingival end of the bracket. Actually the shoulders 43 may be provided at any position along the mesial and distal sides of the pin between the buccal and lingual extremities thereof, and if desired only a single shoulder would serve the purpose. Again the wire engaging shoulder designated by the numeral 41a is like the shoulder 41 on the pin 24. The operation of the pin 24A is like that of pin 24.

The lock pin 24B of FIG. 8 is also provided with an elongated body 39b similar to the body 39 of the pin 24, and differs in that the head 40b is spaced differently than the head 40 of the pin 24. Again the head 40b like the head 40 is enlarged and serves to limit the relative movement between the pin and the bracket and to lock the arch wire in the notch. The buccal side of the head 40b is substantially coplanar with the buccal side of the elongated body 39b, while the mesial and distal sides of the head diverge from the elongated body to a mesial-distal width substantially greater than the mesial-distal width of the body so that the sides of the head serve to engage the buccal-lingual extending edges of the gingival end of the bracket. Again an arch wire shoulder 41b is provided to serve the same purpose in locking the arch wire in the notch as the shoulder 41 of pin 24. While three different forms of lock pin heads have been shown, it should be appreciated that other forms may be provided which would serve the same purpose.

Another quite important feature of the lock pin 24 is that it can be employed with a conventional bracket for securing an arch wire thereto by defining therebetween freedom of tipping and sliding movement. A standard or conventional bracket is like that designated by the numeral 22 wherein it also includes an opening 44 extending occlusal-gingivally for receiving a lock pin. The opening size would be similar to that of the opening 23 in the all-stage bracket 21. This bracket may be of the type that is milled rather than stamped and formed as the all-stage bracket. Again a wire receiving notch 45 is provided at the gingival-lingual corner of the bracket and which coacts with the tooth band 20 to define a slot for receiving the arch wire 30. And the lock pin 22 serves to close the slot and lock the arch wire to the bracket but in such a manner as to define a freedom of movement between the wire and bracket as can be seen particularly in FIG. 2. Thus the lock pin 24 of the present invention is useful in connection with conventional brackets for securing an arch wire thereto in such a manner as to permit mesial-distal freedom of movement.

During the various stages of treatment of a patient, it may be desired, where conventional brackets are employed such as the bracket 22, to effect mesial-distal movement of the teeth roots, which is commonly referred to as "torquing." In order to provide such movement and where a conventional shoulderless lock pin may be employed, a generally T-shaped control pin 46, FIGS. 9–13, may be employed. This pin includes a stem 47 and an arch wire control bar or cross member 48. The arch wire control bar 48 extends perpendicular to the stem 47 and at least at the junction with the stem has the same buccal-lingual thickness as the stem. That is, the control bar may be wider buccal-lingually at its ends or at those portions that extend laterally of the bracket either by an increase in bulk or by bending the ends in a buccal-lingual direction. The mesial-distal width of the stem is slightly less than the mesial-distal width of the opening in the bracket so as to permit ease of insertion, and the buccal-lingual thickness is slightly less than the buccal-lingual depth of the notch so that the arch wire control bar 48 may be received in the notch and extend mesially and distally beyond the mesial and distal sides of the bracket. The upper gingival edge of the control bar 48 is defined by the numeral 49 and extends mesial-distally and normal to the longitudinal axis of the stem and bracket. At one end of the arch wire control bar 48 and on the occlusal side thereof, a ligature notch 50 is formed to receive a ligature 51 of any suitable material thereby tying the arch wire 30 against the gingival edge 49 of the control bar. With the particular installation as shown in FIGS. 9 and 10, a torquing action may be applied to the tooth to move the root in the direction indicated by arrow 52. The arch wire 30 is also secured to the bracket and against the control bar by means of a conventional shoulderless lock pin 53, and this type of an installation precludes sliding of the wire through the bracket. However, if sliding were desired, the shoulder lock pin 24 could be used to prevent binding of the wire with the bracket and the ligature could be loosely applied.

It may be noted that no ligature is utilized at one end of the control bar and it may be appreciated particularly in FIG. 9 that the normal pressure of the wire 30 against the control bar maintains the arch wire in engagement with the control bar at that end. And if torquing action in the opposite direction were desired, the control pin would be rotated 180° before insertion in the bracket so the ligature notch would be properly located for use.

Another control pin embodiment is shown in FIG. 14 and designated generally by the numeral 46A. The only difference between the pin 46A and the pin 46 is that the upper gingival edge 49a of the control bar 48a is inclined with respect to the longitudinal axis of the stem 47a and the bracket. This control pin would be employed where overtorquing action would be desired. In this embodiment, the arch wire 30 may be tied to the end of the control bar 48a opposite the end where pressure would be exerted by the wire by a ligature 51a and for the purpose of obtaining torquing action in the direction indicated by the arrow 54 in FIGS. 9 and 14. It should be appreciated that the assemblage of the pins, wire and bracket in this embodiment is like that in the embodiment of FIG. 11 wherein the control pin is first positioned in the bracket and followed by the positioning of the arch wire thereon and in the notch of the bracket. The locking pin is then placed in the bracket and secured thereto by bending the tail end around the occlusal end of the bracket. Finally, the ligature wire may or may not be secured to tie the non-pressure end of the wire to the control bar. However, it should be appreciated that torquing action would also be obtained where no ligature would be employed. The use of the ligature merely holds a greater length of arch wire against the control bar and increases the initial torquing forces. The end result of torquing the tooth would be the same in either case.

A further control pin embodiment is illustrated in FIG. 15 and designated by the numeral 46B, wherein the control bar 48b only extends in one direction from the stem 47b, thereby fashioning an L-shaped control pin. While the gingival face 49b extends normal to the stem, it may be inclined relative thereto as in the pin 46A. The pin as shown causes a torquing force in the direction of the arrow 55. Moreover, the pin may be turned the other direction and inserted to cause torquing in the opposite direction if so desired. Because the control bar 48b extends laterally of the bracket only to the side receiving pressure from the arch wire and the lock pin 53 secures the wire to the control bar at its terminal end juncturing with the stem 47b, no ligature is needed.

It will be understood that modifications and variations may be effected without departing from the scope of the novel concepts of the present invention, but it is understood that this application is to be limited only by the scope of the appended claims.

The invention is hereby claimed as follows:

1. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body with a buccal-lingual thickness slightly less than the buccal-lingual depth of said opening at the notch and a head having a buccal-lingual depth greater than that of the opening and locking the arch wire to the bracket.

2. An orthodontic lock pin and bracket appliance compring a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said head defining a shoulder on the buccal side engaging the gingival end of the bracket and thereby positioning the pin relative the bracket and defining a shoulder on the lingual side coacting with the notch to lock the arch wire on the bracket.

3. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head having a buccal-lingual thickness substantially greater than said body thickness and defining with said body a shoulder engaging the gingival end of the bracket and a shoulder to span the buccal-lingual depth of said notch to lock the arch wire in place.

4. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head having means to prevent it from being moved into the opening and to span the buccal-lingual depth of said notch to lock the arch wire in place.

5. An orthodontic lock pin and bracket appliance compising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head having a buccal-lingual thickness substantially greater than said body thickness and defining a shoulder on the buccal side engaging the buccal-gingival corner of said bracket, and a shoulder on the lingual side spanning the buccal-lingual depth of said notch, said shoulder on the lingual side of said head being spaced gingivally of the bottom of the notch a distance substantially greater than the cross sectional dimension of the arch wire.

6. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head having a buccal-lingual thickness substantially greater than said body thickness and defining a shoulder on the lingual side spanning the buccal-lingual depth of said notch and a mesial-distal width greater than said opening to define a shoulder engaging the gingival end of the bracket.

7. An orthodontic appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head extending lingually to span the buccal-lingual depth of the notch to lock the arch wire therein, and a generally T-shaped pin having a stem and cross member, said stem extending through said opening and said cross member extending mesial-distally and engaging the bottom of said notch, said T-shaped pin coacting with said lock pin to provide controlled engagement of the arch wire.

8. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head being dimensioned to prevent it from entering the opening and thereby defining it as a stop for engaging the gingival end of the bracket, said head extending lingually to span the buccal-lingual depth of the notch to lock the arch wire therein, and a pivot pin having a stem extending through said opening and a head engaging the bottom of the notch, the gingival end of said head coatcting with the lock pin head to define a pivotal relationship between the bracket and arch wire.

9. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head having a buccal-lingual thickness substantially greater than said body thickness and defining a shoulder on the buccal side engaging the buccal-gingival corner of said bracket, a shoulder on the lingual side spanning the buccal-lingual depth of said notch, and a pivot pin having a stem extending through said opening and a head engaging the bottom of the notch, the gingival end of said head coacting with the lock pin head to define a pivotal relationship between the bracket and arch wire.

10. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head being dimensioned to prevent it from entering the opening and thereby defining it as a stop for engaging the gingival end of the bracket, said head extending lingually to span the buccal-lingual depth of the notch to lock the arch wire therein, and a pivot pin extending through said opening having a substantially triangular shaped head engaging the bottom of the notch, the gingival end of the head being pointed and coacting with the lock pin head to define a pivotal relationship between the bracket and arch wire.

11. An orthodontic lock pin and bracket appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head being dimensioned to prevent it from entering the opening and thereby defining it as a stop for engaging the gingival end of the bracket, said head extending lingually to span the buccal-lingual depth of the notch to lock the arch wire therein, and a pivot pin extending through said opening having an enlarged head fitting in the notch and engaging the bottom thereof, said enlarged head of said pivot pin having a gingival extending point engaging the arch wire and coacting with the lock pin head in defining a pivotal relationship between the bracket and arch wire.

12. An orthodontic appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head extending lingually to span the buccal-lingual depth of the notch to lock the arch wire therein, and an arch wire control pin extending through said opening, said control pin having a stem received in said opening and a head engaging the bottom of said notch, said head having a mesial-distally extending gingival edge for engagement by said arch wire and for coacting with said lock pin head to define a connection between the arch wire and bracket to effect controlled movement of the tooth upon which the bracket is mounted.

13. The orthodontic appliance as defined by claim 12, wherein the mesial-distally extending gingival edge of the control pin extends normal to the occlusal-gingival axis of the bracket.

14. The orthodontic appliance as defined by claim 12, wherein the mesial-distally extending gingival edge of the control pin extends along an incline to the occlusal-gingival axis of the bracket.

15. The orthodontic appliance as defined by claim 12, wherein said control pin is T-shaped.

16. The orthodontic appliance as defined by claim 12, wherein said control pin is L-shaped.

17. An orthodontic appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head extending lingually to span the buccal-lingual depth of the notch to lock the arch wire therein, and an arch wire control pin extending through said opening, said control pin having a stem received in said opening and a head engaging the bottom of said notch, said head having a mesial-distally extending gingival edge for engagement by said arch wire and for coacting with said lock pin head to define a connection between the arch wire and bracket to effect controlled movement of the tooth upon which the bracket is mounted, and means for additionally securing the arch wire to the control pin head laterally of the bracket to obtain further controlled movement of the bracket.

18. An orthodontic appliance comprising a bracket secured to a tooth band having a body extending outwardly thereof, an occlusal-gingivally extending opening in said body and a mesial-distally extending notch at the gingival-lingual corner of said body, a mesial-distally extending arch wire received in said notch, and a lock pin received in said opening and coacting with said notch to secure the arch wire to said bracket, said lock pin having an elongated body and a head, said body having a buccal-lingual thickness such as to be received in said opening and not to extend into said notch, said head extending lingually to span the buccal-lingual depth of the notch to lock the arch wire therein, and an arch wire control pin extending through said opening, said control pin having a stem received in said opening and a head engaging the bottom of said notch, said head having a mesial-distally extending gingival edge for engagement by said arch wire and for coacting with said lock pin head to define a connection between the arch wire and bracket to effect controlled movement of the tooth upon which the bracket is mounted, and a ligature tying the arch wire to one end of the control pin head laterally of the bracket.

19. An orthodontic lock pin and bracket appliance comprising a bracket secured to a tooth band, said bracket having a body extending outwardly of the tooth band, an opening in said body extending occlusal-gingivally and a mesial-distally extending notch at the gingival-lingual corner of said body, a mesial-distally extending arch wire therein, the buccal-lingual depth of said notch as defined with the tooth band being slightly greater than the buccal-lingual depth of the arch wire and the occlusal-gingival depth of said notch being substantially greater than the occlusal-gingival depth of said arch wire, and a lock pin having an elongated shank and an enlarged head, said elongated shank being received in said bracket opening, said head having a shoulder on the lingual side coacting with the bracket notch and tooth band to define an arch wire slot for securing the arch wire to said bracket and tooth band, means projecting from said head and engaging with the gingival end of the bracket to thereby position the pin relative to the bracket so that the shoulder defined by the head at the lingual side of the pin is so spaced from the occlusal end of the arch wire slot to define an occlusal-gingival slot depth substantially greater than the occlusal-gingival depth of the arch wire to thereby permit mesial-distal tipping of the bracket relative to the arch wire.

References Cited in the file of this patent

UNITED STATES PATENTS 1,322,994     Angle _____ Nov. 25, 1919